US008851566B2

(12) United States Patent
Bigolin

(10) Patent No.: US 8,851,566 B2
(45) Date of Patent: Oct. 7, 2014

(54) VENTILATED SADDLE STRUCTURE

(76) Inventor: Giuseppe Bigolin, Rossano Veneto (IT)

( * ) Notice: Subject to any disclaimer, the term of this patent is extended or adjusted under 35 U.S.C. 154(b) by 386 days.

(21) Appl. No.: 13/497,037

(22) PCT Filed: Jul. 29, 2010

(86) PCT No.: PCT/IB2010/053446
§ 371 (c)(1),
(2), (4) Date: Jun. 7, 2012

(87) PCT Pub. No.: WO2011/033398
PCT Pub. Date: Mar. 24, 2011

(65) Prior Publication Data
US 2012/0242119 A1 Sep. 27, 2012

(30) Foreign Application Priority Data

Sep. 21, 2009 (IT) ................................ VI2009A0226

(51) Int. Cl.
*B62J 1/02* (2006.01)
*B62J 1/00* (2006.01)
*B62J 1/24* (2006.01)
*B62J 1/08* (2006.01)

(52) U.S. Cl.
CPC .... *B62J 1/00* (2013.01); *B62J 1/24* (2013.01); *B62J 1/08* (2013.01)
USPC ......... 297/215; 297/195.1; 297/197; 297/198

(58) Field of Classification Search
USPC ................................ 297/195.1, 197, 198, 215
See application file for complete search history.

(56) References Cited

U.S. PATENT DOCUMENTS

| 5,333,930 | A  | * | 8/1994  | Glenn ...................... 297/219.11 |
| 5,356,205 | A  | * | 10/1994 | Calvert et al. ............ 297/452.41 |
| 6,629,728 | B2 | * | 10/2003 | Losio et al. ................ 297/195.1 |
| 7,055,900 | B2 | * | 6/2006  | Losio et al. ................ 297/195.1 |
| 7,059,674 | B2 | * | 6/2006  | Garland et al. ............... 297/204 |
| 7,547,064 | B2 | * | 6/2009  | Garneau .................... 297/195.1 |
| 2002/0093229 | A1 | * | 7/2002  | Losio et al. ................ 297/195.1 |
| 2004/0004373 | A1 | * | 1/2004  | Garland et al. ............ 297/195.1 |
| 2007/0273184 | A1 |   | 11/2007 | Garneau |

FOREIGN PATENT DOCUMENTS

| EP | 0353201 | 1/1990 |
| GB | 769327  | 3/1957 |

* cited by examiner

*Primary Examiner* — David E Allred
(74) *Attorney, Agent, or Firm* — Themis Law

(57) ABSTRACT

A ventilated saddle structure for bicycles, motorbikes and/or pedal powered machines, comprising: a support frame (2) designed to be anchored to a bicycle, motorbike and/or pedal powered machine, a seating surface (3) associated with the frame (2), wherein the seating surface (3) comprises a membrane (4) made of a perforated and at least partially deformable material, shaped to match the user anatomy. The frame (2) comprises at least one thrust device designed to elastically interact from below with the membrane (4) to appropriately counter the deformation thereof and to support the user.

7 Claims, 6 Drawing Sheets

VENTILATED SADDLE STRUCTURE

FIELD OF THE INVENTION

The present invention generally finds application in the field of human body support devices, and particularly relates to a ventilated saddle structure, particularly for bicycles, motorbikes and other pedal-powered machines.

BACKGROUND ART

Saddles for bicycles, motorbikes or other pedal-powered machines, such as exercise bicycles and spinning bikes, are generally formed of a shell or frame made of plastic or relatively rigid materials, with a seating surface made of a leather or synthetic cover, possibly formed of multiple layers and/or padded, associated therewith.

Particularly, saddles for bicycles or the like are supports that impart considerable stresses on the user body while pedaling, especially in the perineal region and at the ischial bones.

Indeed, during pedaling, the user's legs rub against the saddle cover.

Furthermore, the relative deformability of the cover, prevents optimal distribution of the user's weight. In other words, each area of the cover reacts on the user's body with a given reaction force that changes from point to point and is different from person to person, according to weight size and/or position.

Certain studies have shown that pressure concentrations can lead to urinary tract and blood vessel disorders.

In an attempt to obviate such drawbacks, a number of saddle types have been developed, which feature local pads of various materials, as well as special shell shapes or apertures, sometimes particularly complex. Nevertheless, while these solutions provide improved seating comfort they still hinder ventilation of the rubbed parts, and cause drawbacks such as overheating of the regions under stress of the user's body.

An additional problem encountered in prior art saddle structures is that they are often left outdoors, and are hence exposed to weather agents, particularly rain, but also sun. Furthermore, the seating surface may be required to be periodically cleaned with water and other liquid agents. Thus, saddle covers may absorb and retain water, dust, smog and other impurities which are transferred to the user, unless appropriate protections are provided such as plastic hoods or bags, and may cause sometimes irreversible damages to his/her clothes. Furthermore, due to the accumulation of moisture in the saddle pad, the saddle structure is exposed to inevitable and progressive physical degradation.

U.S. Pat. No. 7,059,674 discloses a bicycle saddle with a seating surface made of a membrane stretched over an underlying frame, to create a convex shape that defines the seating surface.

The membrane is formed of various materials selected among low-deformation fabrics and nets, to ensure that the shape and the stretching state can be maintained for a given time. Otherwise, the membrane may be made of an elastomeric sheet with holes arranged thereon to facilitate ventilation and allow at least partial passage of water, which makes it almost unusable.

One drawback of this prior art structure is that the membrane, that is initially well stretched and shaped, is subject to strain, leading with time to permanent deformation of its shape and possibly to its separation from the frame. Furthermore the membrane automatically fits the anatomy of the user's body and yields in the central area.

Therefore, the need arises of effectively and continuously counteracting the local strain of the membrane while maintaining the open structure of the cover to ensure ventilation of the regions of the body more exposed to overheating and allowing water and other weather agents to pass through the seating surface.

Furthermore, there is the problem of providing a lighter saddle structure, thereby improving comfort and setting a lower center of gravity for the vehicle on which it is mounted.

DISCLOSURE OF THE INVENTION

A general object of this invention is to obviate the above drawbacks, by providing a ventilated saddle structure that ensures high efficiency and cost effectiveness.

A particular object is to provide a ventilated saddle structure characterized by excellent ventilation at the regions of the human body subject to rubbing and overheating, to ensure high comfort for the user.

A further object is to provide a saddle structure in which the configuration of the cover that withstands the user's weight during use remains unchanged, even after extended use.

Another object of the invention is to provide a saddle structure that allows the rigidity and elasticity to be adapted to the specific user's needs.

Yet another object of the invention is to provide a saddle structure that allows ready discharge of any water and liquid falling thereon and has low maintenance requirements.

A further object is to provide a very light saddle structure, allowing weight reduction and setting a lower center of gravity of the bicycle or motorbike on which it is mounted.

These and other objects, as better explained hereafter, are fulfilled by a ventilated saddle structure as defined in the main claim.

The ventilated saddle structure of the invention comprises features known in the art, i.e. a support frame designed to be anchored to a bicycle, motorbike or pedal powered machine, a seating surface associated with the frame, whose shape is designed to fit the anatomy of the user, wherein the seating surface comprises a membrane made of a perforated and resilient material.

The saddle structure is differentiated from and characterized with respect to the state of the art in that it comprises at least one thrust device designed to elastically interact from below with the membrane to appropriately counter the deformation thereof, thereby keeping the configuration of the seating surface substantially unchanged during use.

With this configuration, the saddle will be effectively ventilated and permeable to external and weather agents, with no substantial deformation of its cover in the user supporting area, even after extended use.

Furthermore, due to the presence of the thrust device, the perforated membrane will be able to effectively support the user while affording optimized distribution of his/her weight over the seating surface.

Also, the saddle may be easily washed and dried to ensure perfect cleaning and avoid damages to the user.

The light weight of the membrane will also afford an overall reduction of the structure weight, and set a lower center of gravity for the vehicle on which it is mounted.

BRIEF DESCRIPTION OF THE DRAWINGS

Further features and advantages of the invention will be more apparent from the detailed description of a preferred, non-exclusive embodiment of a saddle structure according to the invention, which is described as a non-limiting example with the help of the annexed drawings, in which.

DETAILED DESCRIPTION OF A PREFERRED EMBODIMENT

Figure 1:
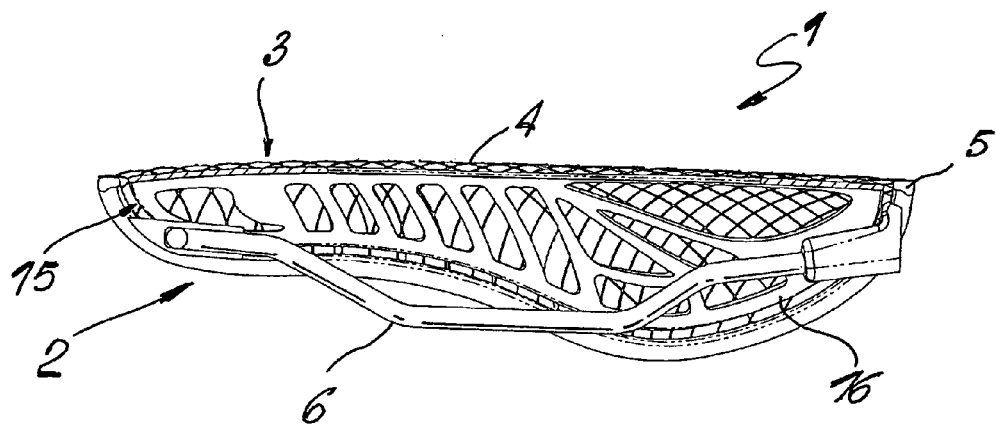
FIG. 1 is a longitudinal sectional view of a first embodiment of the saddle structure of the invention.

Referring to the above figures, there is shown a ventilated saddle structure for bicycles, motorbikes or pedal-powered machines, such as an outdoor or indoor exercise bicycle.

In the embodiments as described below, identical or corresponding parts will be designated by the same reference numerals.

The saddle structure, which is generally designated by numeral 1, comprises a support frame 2 designed to be anchored to a bicycle or a pedal-powered machine, not shown, by means of a conventional seat post C, as shown in FIG. 1 and known per se.

A seating surface, generally designated by numeral 3, is associated with the frame 2, and comprises a membrane 4 or cover made of an at least partially elastically deformable material, which is conformed and perforated with holes 4' to support the user and impart considerable comfort and to allow ventilation of the parts of the body more subject to overheating, which are known to be concentrated in the perineal and ischial region.

According to a further aspect of the invention, the frame 2 comprises at least one peripheral upper element 5 and at least one lower element 6 for stiffening the peripheral element 5 and anchoring it to a frame of a bicycle or a pedal-powered machine.

The material of the membrane 4 may be selected from the group comprising nets, fabrics and plastic materials in sheet form, and will have through holes 4' large enough for easy passage of air and other fluids.

In certain preferred, non-limiting embodiments, the net and/or fabric may include threads with a metal or high-resistance synthetic core, to impart an elastically deformable configuration to the membrane 4. Conveniently, these threads may be impregnated with polymeric materials and plastically conformed to fit the shape of a standard user.

The peripheral upper element 5 may be made of a relatively rigid material, preferably a plastic and preferably reinforced material or of a metal material, and its plan shape may include a tapered front portion 5' and a widened rear portion 5".

Preferably, the peripheral element 5 is slightly recessed along its inner edge, such recess being deep enough for tightly accommodating the outer edge 4" of the membrane 4.

The membrane 4 may be anchored to the peripheral element 5 in various manners, e.g. by co-molding, gluing by adhesives, heat sealing, ultrasonic welding or the like, to ensure stable coupling with no projection or burr, to minimize rubbing for the user at the edges.

The lower stiffening element 6 may consist of a conventional substantially V-shaped fork, with a folded front end portion 7 and a pair of rear free ends 8, 9 connected by height-offset central portions 10, 11 and designed for connection by the post C. As is known per se, the material that forms the fork 6 may be selected from the group comprising ferrous and non-ferrous metal materials and fiber-reinforced composite materials.

Conveniently, the peripheral element 5 has a central tubular housing 12 at its front portion 5', which is wide enough to stably accommodate the front portion 7 of the stiffening element 6 and, at its rear portion, a pair of lateral supports 13, 14, also of tubular shape, which are located in substantially symmetric positions with respect to the longitudinal center plane and have sufficient diameters to stably accommodate the rear free end portions 8, 9 of the stiffening element 6.

According to the invention, the frame 2 has at least one thrust device susceptible of elastically interacting with the cover 4 from below, i.e. by contact with the bottom surface of the cover 4.

Suitably, the thrust device, generally designated by numeral 15, is interposed between the peripheral element 5 and the stiffening element 6.

This thrust device 15 will allow the elastic strain of the membrane 4 to be adequately counteracted, and ensure user support during use. The local yield that typically occurs in conventional available saddles having net or perforated sheet covers but no strain counteracting element is thus prevented.

Advantageously, the thrust device 15 may include a specially shaped presser element 16 whose plan shape is substantially contained in the peripheral element 5 and a top face designed to act upon the bottom surface of the membrane.

Conveniently, the presser element 16 may consist of a substantially semi-rigid sheet-like element having ventilation openings of various shapes, generally designated by numeral 17, which are symmetrically arranged at least in the ischial 17' and crotch 17" regions, and help to reduce the weight of the saddle structure.

These openings 17, 17', 17" will apparently allow both air and water or other desired or undesired fluids, to flow out of the cover 4. Especially in combination with the holes 4' of the membrane, the holes 17, 17', 17" may allow fast and thorough drying of the saddle when it is wet with moisture or rain, as well as further maintenance, particularly cleaning and sanitization thereof.

Figure 2:
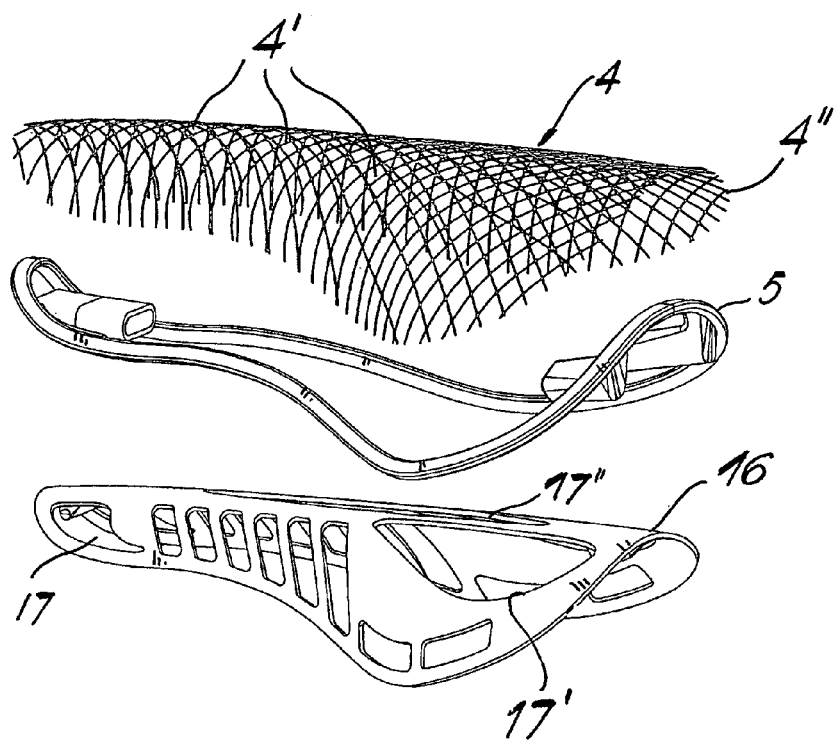
FIG. 2 is an exploded view of the saddle structure of FIG. 1.

Referring to FIGS. 1 and 2, a first simplified embodiment is shown, which is designed for OEM supply on bicycles and motorbikes.

In this embodiment, the presser element 16 that defines the thrust device 15 is integrated with the peripheral element 5 along with the membrane 4. The three components 4, 5, 16, which are shown in exploded form in FIG. 2, may be coupled in any manner, i.e. by molding, gluing or welding, to provide an integral subassembly, on which the lower stiffening element 6 may be mounted to form the finished saddle structure.

Referring to FIGS. 3-9, a second more complex embodiment is shown, which may be designed for a more demanding market and to the so-called after-market.

Figure 3:
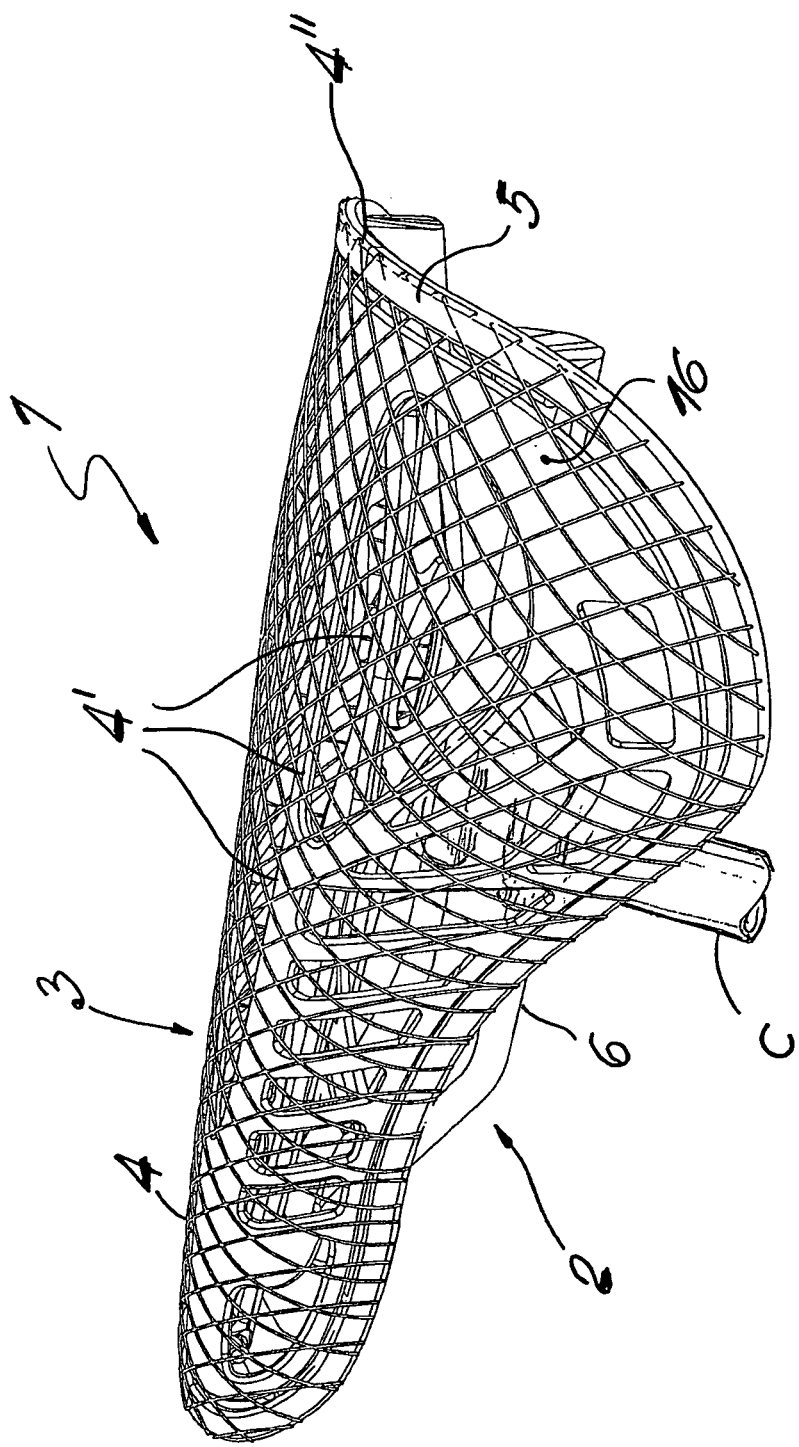
FIG. 3 is a perspective elevational view of a second embodiment of the saddle structure of the invention.

This embodiment differs from that described above in that, in addition to the above mentioned presser element 16, the thrust device 15 also comprises an elastic compression element, generally designated by numeral 18, which is preferably located along a longitudinal symmetry plane II-II in FIG. 3.

Figure 5:
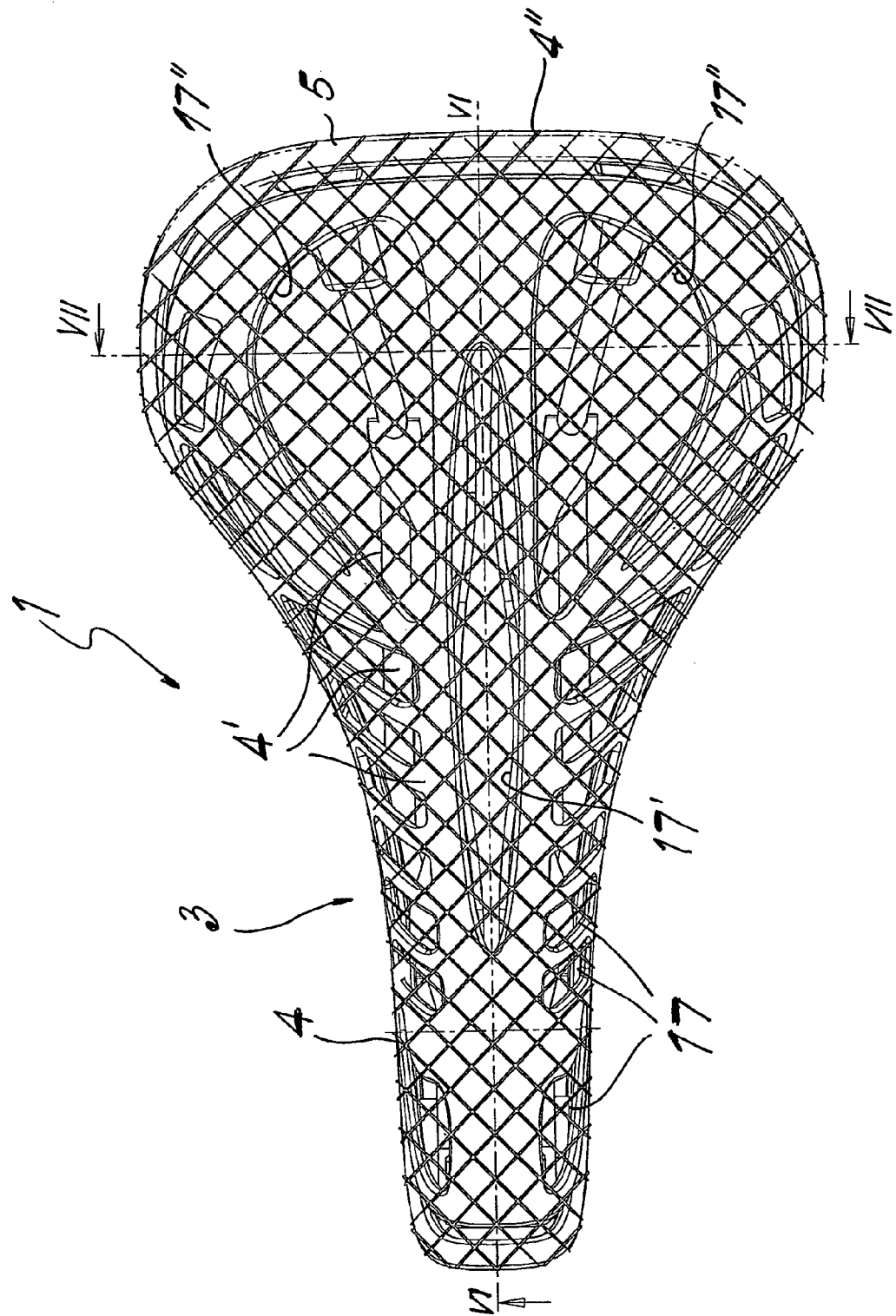
FIG. 5 is a top view of the saddle structure of FIG. 3.
Figure 6:
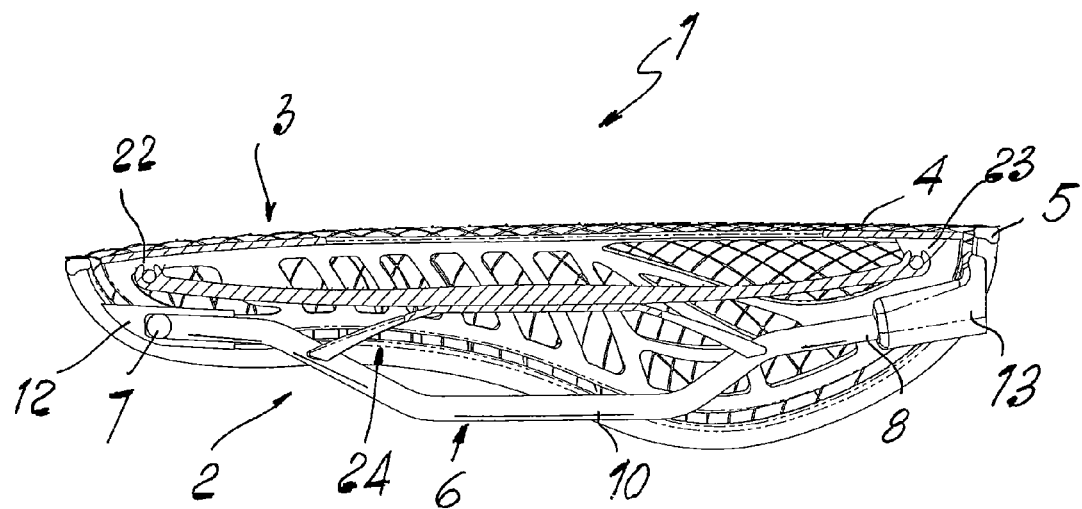
FIG. 6 is a longitudinal sectional view of the saddle structure of FIG. 3 as taken along the plane VI-VI of FIG. 5.
Figure 7:
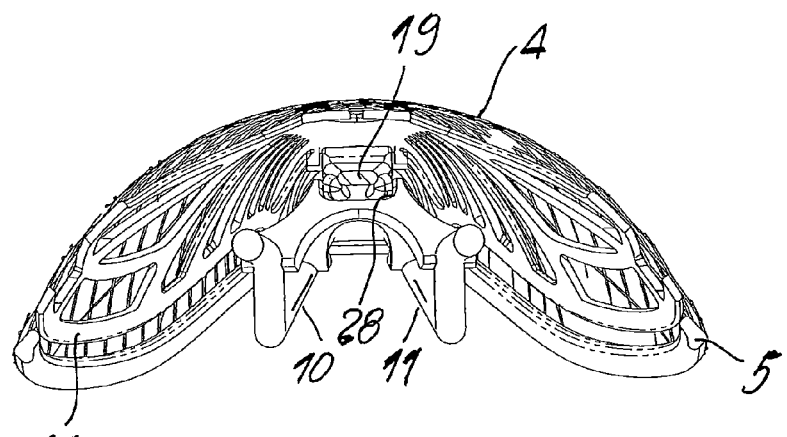
FIG. 7 is a cross sectional view of the saddle structure of FIG. 3 as taken along the plane VII-VII of FIG. 5.
Figure 8:
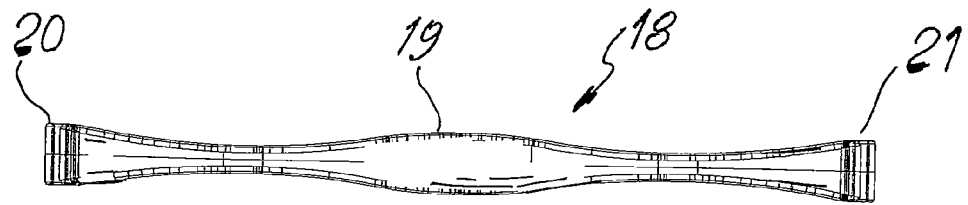
FIG. 8 is a top view of a first detail of FIG. 3.
Figure 9:
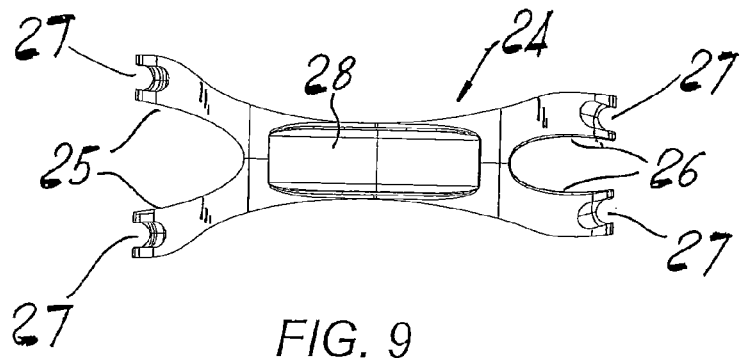
FIG. 9 is a top view of a second detail of FIG. 3.

Suitably, the elastic compression element 18 has an elongate shape, curved in the longitudinal plane of symmetry VI-VI of FIG. 5, with upward concavity, to impart a first elastic constant $\epsilon_1$ for stresses directed toward its plane of curvature.

Figure 4:
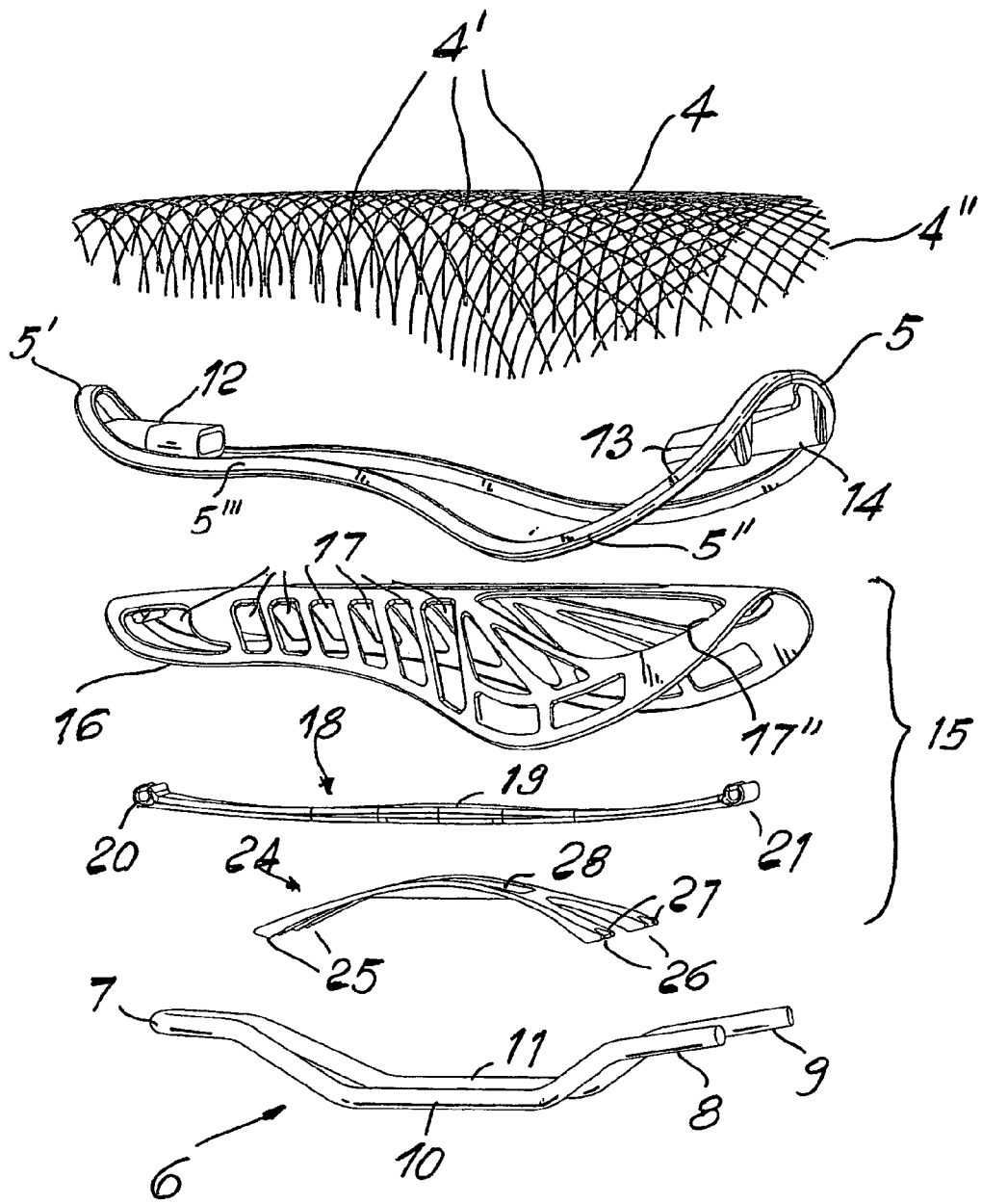
FIG. 4 is an exploded perspective view of the saddle structure of FIG. 3.

Advantageously, the element 18 has a central portion 19 of substantially constant section and tapered end portions 20, 21. Connection members, preferably of hinge type, designated 22, 23 in FIG. 4 are provided at such end portions 20, 21 for connection with the facing end portions of the presser element 16.

A support 24 is also provided for attachment to the stiffening element 6.

Advantageously, the support 24 may consist of an upside-down cradle having a substantially X plan shape, with two front appendices 25 and two rear appendices 26 having troughs 27 for holding and stably locking the branches of the fork that acts as a stiffening element 6. Furthermore, such cradle support 24 may have a longitudinal central seat 28 which is shaped for freely and accurately accommodating the enlarged central portion 19 of the elastic compression element 18. In addition to supporting the latter during the effort generated by the user, this prevents the elastic compression element 18 from being displaced with respect to the vertical plane of symmetry that might damage it.

The purpose of the elastic return element 18 is to hold the presser element 16 typically pressed upwards to force the membrane 4 upwards and hold it in its original conformation, thereby counteracting or at least limiting the deformation caused by the user's weight.

The elastic compression element 18 may be equipped with elastic constant adjustment means, generally designated by numeral 29.

Figure 10:
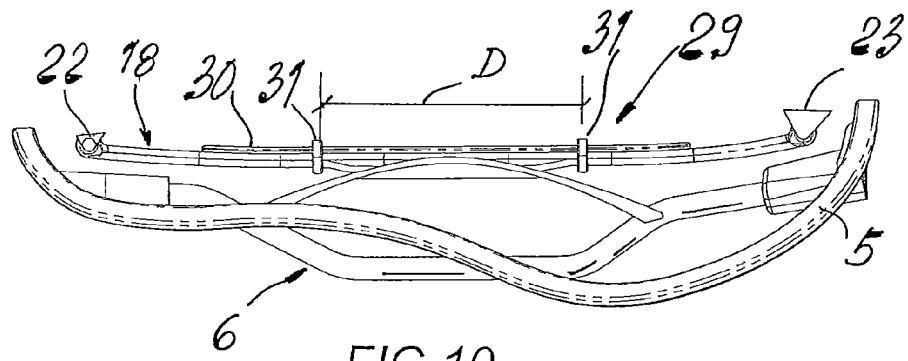
FIG. 10 is a sectional view of a third embodiment of the saddle structure of the invention, with certain parts being omitted for clarity, as taken along a longitudinal symmetry plane X-X of FIG. 11.
Figure 11:
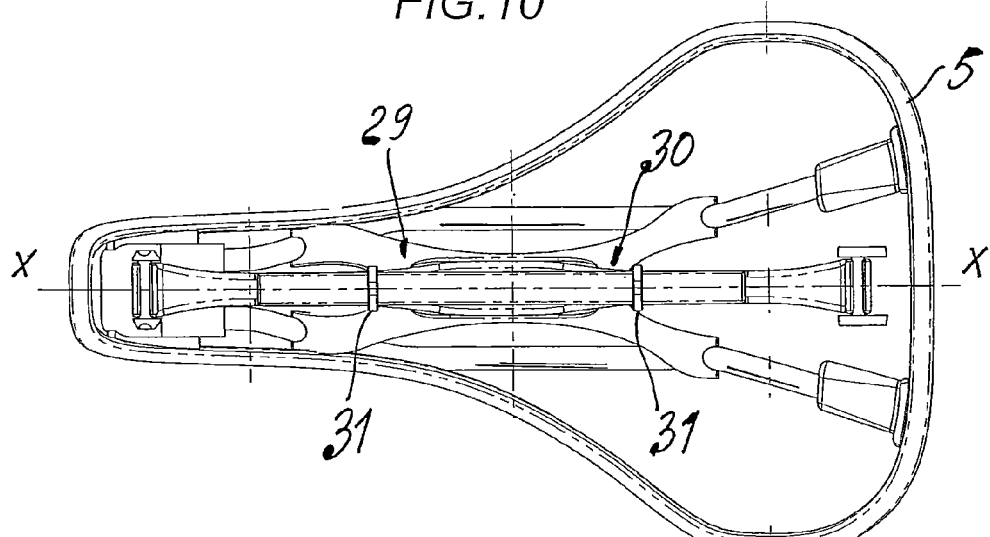
FIG. 11 is a top view of the structure of FIG. 10.

Referring to FIGS. 10 and 11, there is disclosed a third embodiment of the saddle structure of the invention, which differs from the second embodiment in that it includes means for adjusting the elastic compression element.

These adjustment means, generally designated by numeral 29, may consist of an elastic sheet 30, e.g. made of harmonic steel or the like, having a second elastic constant $\epsilon_2$.

The sheet 30 is coupled to the elastic compression element 18 at its central, constant section portion 19, by at least one pair of connection rings 31, which are adapted to hold the sheet 30 and the compression element 18 in wiping contact and are at a predetermined distance D from each other.

Thus the elastic constant of the compression element 18 as a whole will tend to a value $\epsilon_m$ equal to the mean $(\epsilon_1+\epsilon_2)/2$ of the two elastic constants. Furthermore, appropriate adjustment of the distance D between the two connection rings 31 will control the elasticity of the system to adapt it to the user's weight, while ensuring constant contact of the presser element 16 against the bottom surface of the membrane 4.

Obviously, the configuration of the adjustment means may be even considerably different from the one described above, as long as they provide the same final effect.

In operation, the user may sit on the seating surface of the membrane 4, that is inherently compliant and comfortable during use. When the user gets off the saddle, the presser element 16 is stressed upwards by the compression element 18 and automatically moves the membrane 4 back to its original position, while preventing any undesired and unaesthetic local depressions and yielding deformations, especially at its center, for a long time, certainly longer than the maximum life of prior art saddle models having no thrust means.

The user may increase the elastic response of the thrust device 18 according to weight and size by using the adjustment means 29 to change the elastic constant of the system.

Also, the membrane 4 with the holes 17, 17', 17" of the presser element 16 may ensure proper ventilation of the user especially at the regions subject to rubbing, thereby ensuring comfort and relief, as well as fast discharge of water and any other liquid that might fall on the membrane 4, thereby considerably facilitating drying.

The saddle structure of this invention is susceptible of a number of changes and variants, within the inventive concept disclosed in the appended claims. All the details thereof may be replaced by other technically equivalent parts, and the materials may vary depending on different needs, without departure from the scope of the invention.

While the saddle structure has been described with particular reference to the accompanying figures, the numerals referred to in the disclosure and claims are only used for the sake of a better intelligibility of the invention and shall not be intended to limit the claimed scope in any manner.

The invention claimed is:

1. A ventilated saddle structure for bicycles, motorbikes, or pedal powered machines, comprising:
   a support frame (2) designed to be anchored to a bicycle, motorbike, or pedal powered machine; and
   a seating surface (3) associated to said frame (2);
   wherein said seating surface (3) comprises a membrane (4) made from a perforated and at least partially deformable material, shaped to match a user's anatomy;
   wherein said frame (2) comprises at least one thrust device (15) designed to elastically interact from below with said membrane (4);
   wherein said frame (2) further comprises at least one upper peripheral member (5) designed to support said membrane (4) and at least one lower stiffening member (6) susceptible to be anchored to a bicycle, motorbike, or pedal-powered machine;
   wherein said thrust device (15) is interposed between said membrane (4) and said stiffening member (6) and comprises at least one shaped pressure member (16) having a plan shape corresponding to a shape of said peripheral member (5) and an upper face designed to act on a lower surface of said membrane (4);
   wherein said pressure member (16) is a substantially laminar member with a shape complementary to and facing said membrane (4) and is provided with venting apertures (17, 17', 17") adapted to be located at least in the user's ischiatic and scrotal zones and close to edges of said pressure member (16);
   wherein said pressure member (16) and said membrane (4) are unitarily joined to said peripheral member (5); and
   wherein said thrust device (15) further comprises at least one elastic compression member (18) located below said pressure member (16), said elastic compression member (18) being adapted to force upwards said membrane (4) to hold said membrane (4) in original conformation, thereby counteracting or at least limiting a deformation caused by the user's weight.

2. The Structure as claimed in claim 1, wherein said peripheral member (5) has a tapered front portion (5') and a widened rear portion (5") in correspondence of the users' ischiatic bones, said membrane (4) having a peripheral outer edge (4") for anchorage to said peripheral member (5).

3. The structure as claimed in claim 2, wherein said elastic compression member (18) has tapered longitudinal end portions (20, 21) for coupling with said pressure member (16)

and one middle portion (19) having transverse section larger than said end portions (20, 21).

4. The structure as claimed in claim 3, wherein said thrust device (15) further comprises a support (24) locatable on said lower stiffening member (6), said support having a longitudinal middle seat (28) designed to house said middle portion (19) of said elastic compression member (18).

5. The structure as claimed in claim 3, wherein said thrust device (15) comprises adjusting means (29) for adjusting said elastic compression member (18).

6. The structure as claimed in claim 5, wherein said adjustment means (29) comprises at least one elongated leaf member (30) with longitudinal extension smaller than said compression member (18), said leaf member (30) being designed to be firmly joined to this compression member (18) by at least one pair of connecting rings (31) to provide an assembly with a predetermined elastic factor ($\epsilon_m$).

7. The structure as claimed in claim 1, wherein the perforated and at least partially deformable material forming said membrane (4) is selected from the group consisting of meshes, webs, fabrics, reinforced plastic materials, provided with apertures (4') to allow passage of air towards and from said seating surface (3).

\* \* \* \* \*